United States Patent
Mikolai et al.

(10) Patent No.: US 6,913,309 B2
(45) Date of Patent: Jul. 5, 2005

(54) VEHICLE DOOR ARRANGEMENT

(75) Inventors: Donald G. Mikolai, Dearborn, MI (US); Matthew Carey, Brownstown, MI (US); Muhammed Ayub, Canton, MI (US); Stanley Liu, Livonia, MI (US); Kelly Kohlstrand, Grosse Ile, MI (US); Stephen L. Bruford, West Bloomfield, MI (US); David Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/724,496

(22) Filed: Nov. 28, 2003

(65) Prior Publication Data

US 2004/0174040 A1 Sep. 9, 2004

Related U.S. Application Data

(63) Continuation of application No. 10/249,836, filed on May 12, 2003, now Pat. No. 6,848,737.
(60) Provisional application No. 60/430,297, filed on Dec. 2, 2002.

(51) Int. Cl.[7] .................................................. B60J 5/04
(52) U.S. Cl. ................................ 296/146.1; 296/146.6; 296/146.7
(58) Field of Search ........................... 296/146.1, 146.2, 296/147, 146.5, 146.6, 146.9, 146.15, 146.16, 149; 49/501, 503, 366, 367; 292/DIG. 23, DIG. 27, 336.3, DIG. 21

(56) References Cited

U.S. PATENT DOCUMENTS

| | | | | |
|---|---|---|---|---|
| 5,466,031 A | * | 11/1995 | Uchida et al. | 296/146.6 |
| 5,491,875 A | * | 2/1996 | Siladke et al. | 16/346 |
| 6,053,561 A | * | 4/2000 | Hojnowski et al. | 296/146.11 |
| 6,059,352 A | * | 5/2000 | Heldt et al. | 296/146.6 |
| 6,213,535 B1 | * | 4/2001 | Landmesser et al. | 296/146.12 |
| 6,234,565 B1 | * | 5/2001 | Bryant et al. | 296/155 |
| 6,575,525 B2 | * | 6/2003 | Traister et al. | 296/146.6 |
| 6,634,698 B2 | * | 10/2003 | Kleino | 296/146.6 |
| 6,694,676 B2 | * | 2/2004 | Sakamoto et al. | 49/366 |
| 6,779,831 B2 | * | 8/2004 | Moriyama | 296/146.9 |
| 2003/0111863 A1 | * | 6/2003 | Weyerstall et al. | 296/146.1 |
| 2004/0135395 A1 | * | 7/2004 | Pugh et al. | 296/146.9 |

* cited by examiner

Primary Examiner—H. Gutman
(74) Attorney, Agent, or Firm—Gigette M. Bejin; Dykema Gossett

(57) ABSTRACT

A vehicle 7 is provided having a vehicle body 36 with an opening 16 having first and second ends 18, 20. The vehicle body 7 has a first door 22. A second door 28 has a latched connection 42 with the vehicle body between the opening 16 first and second ends 18, 20. The second door 28 has a window regulator 250 to move a window pane 254 in and out of a window opening 212.

21 Claims, 14 Drawing Sheets

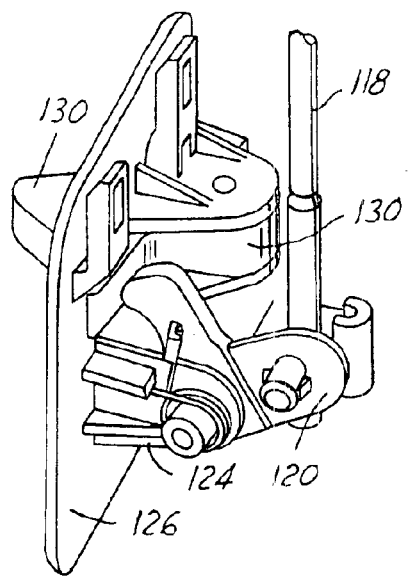
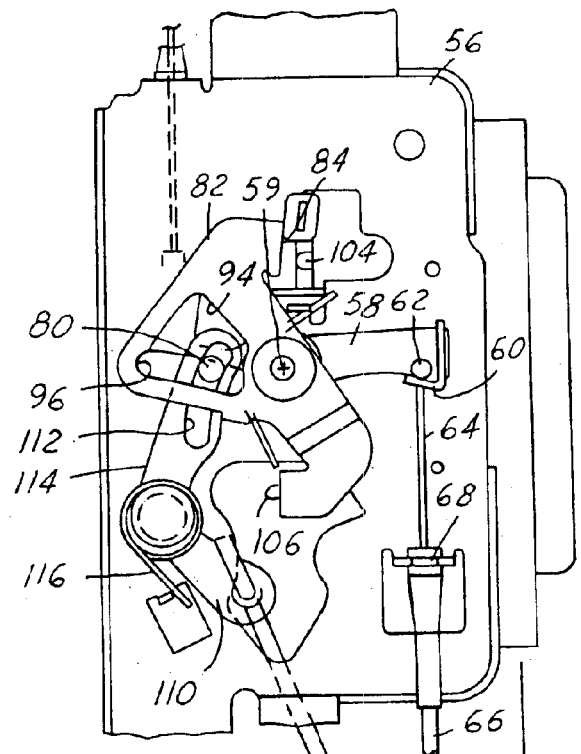
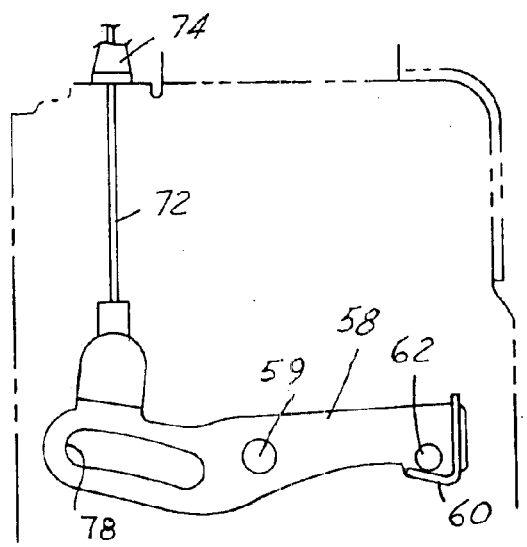
FIG. 19
FIG. 21
FIG. 20

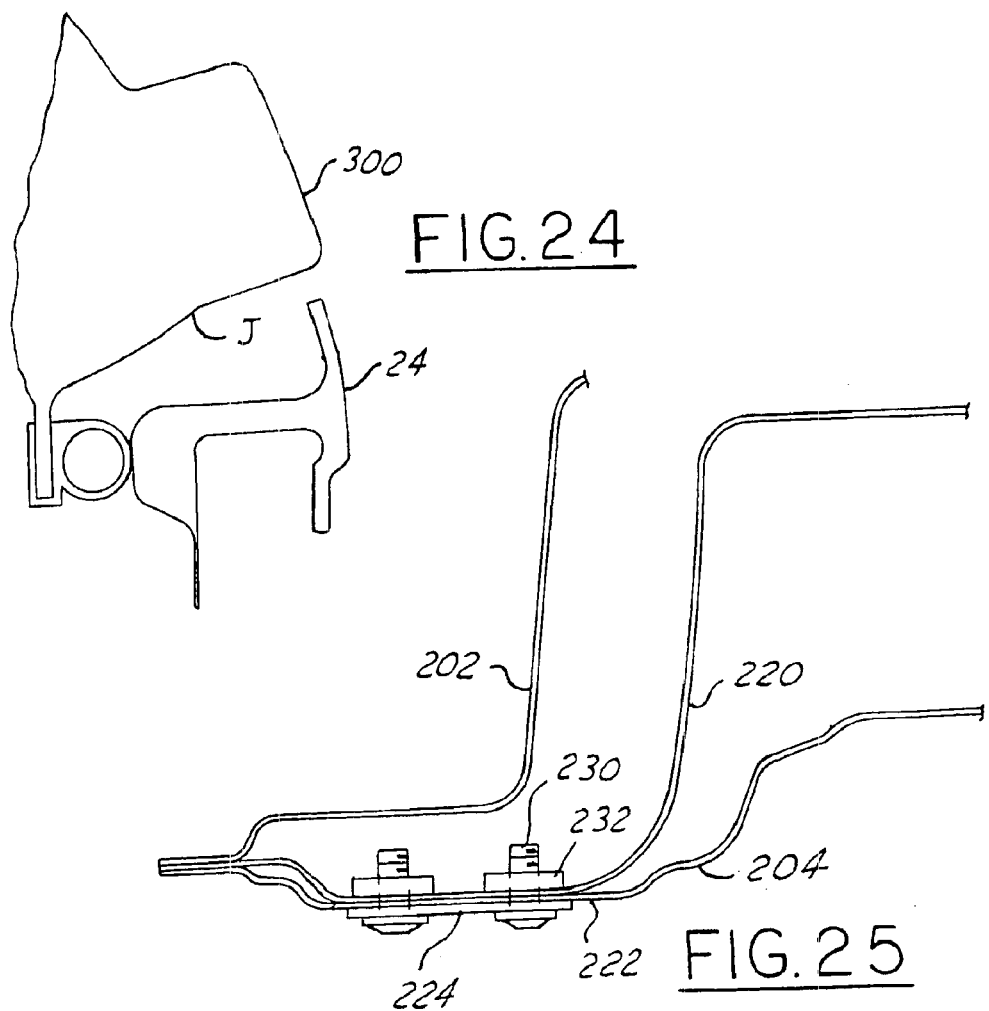
FIG. 24
FIG. 25
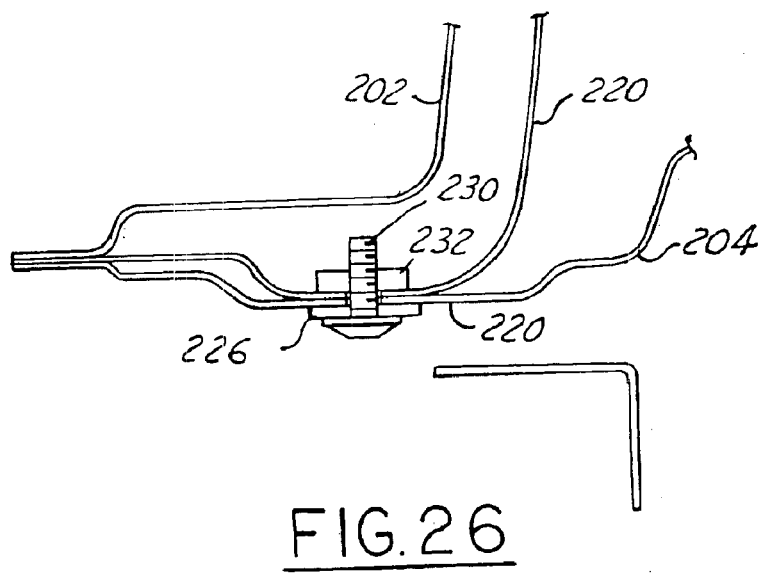
FIG. 26

VEHICLE DOOR ARRANGEMENT

This application is a continuation in part of U.S. patent application Ser. No. 10/249,836 filed May 12, 2003 now U.S. Pat. No. 6,848,737 and claims the benefit thereof as well as the benefit of U.S. Provisional application Ser. No. 60/430,297 filed Dec. 2, 2002.

FIELD OF THE INVENTION

The field of the present invention is a vehicle with an opening wherein an enclosure is provided by two movable doors that abut one another.

BACKGROUND OF THE INVENTION

In the beginning most pickup trucks had a forward cab, which had a rear wall that was closely adjacent to a bench-type seat. As pickup trucks became increasingly popular, a new type of vehicle was developed having an extended cab to provide space rearward of the front bench seat. This space can be utilized for smaller passengers or for an enclosed cargo area. With the development of extended cab pickup trucks, there has come forth a desire for both front and rear side doors to the cab area.

The rear door, often referred to as the access door, like most vehicle doors is primarily formed from stamped sheet metal pieces which are welded together to form a spaced envelope therebetween. The rear door in the extended cab pickup truck is narrower than the front door. Accordingly the window opening on the rear door tends to be narrower.

The rear door typically has two release handles. One handle is located on the interior of the access door, while the other release handle is typically placed on an exterior panel or shut face of the access door that faces an abutting shut face of the front door.

The interior handle is pivotably mounted to a latch release mechanism which is mounted to the interior panel. A large portion of the release mechanism protrudes into an interior of door within the spaced envelope between the interior panel and the outer panel. This protrusion into the spaced envelope prevents the utilization of a moveable window for the door due to clearance issues for the window glass and window regulator. Accordingly most rear doors on extended cab type pickup trucks are either fixed or can only partially open or are made very narrow.

The above noted clearance problem is even more pronounced on an insert type door versus a limousine type door. In a limousine type door the spaced enveloped is typically wider in the vehicle transverse direction. In an insert type door the spaced envelope is typically narrower in the vehicle transverse direction.

It is desirable to provide a pickup truck type vehicle with a rear access door with a wide window opening with a fully opening window. It is additionally desirable to provide a vehicle as described above wherein the rear access door has only one release handle to open the access door either from the interior or from the exterior of the vehicle. It is also desirable to provide such an aforedescribed vehicle wherein the handle can be pulled inward to release the access door or wherein the handle can be pulled outward to release the access door.

SUMMARY OF THE INVENTION

To make manifest the above delineated desires, a revelation of the present invention is brought forth. In the preferred embodiment, the present invention provides a vehicle having a body with an interior and an exterior. The vehicle body has an opening with first and second extreme ends. Adjacent to the first end of the opening is a pivotally connected first or front door. Pivotally connected adjacent to the second end of the opening is a second or rear access door. The rear access door has an outer panel and an inner panel forming a spaced envelope therebetween. The inner and outer panels have an aligned window opening.

Adjacent the front door the rear door has a reinforcement panel juxtaposed between the inner and outer panels. A first section is formed wherein the inner and reinforcement panels are closely laterally mated. A brain plate is provided which is connected to the inner panel on the first section. Pivotally connected to the brain plate is a force transmission member. The force transmission member is part of a release mechanism to unlatch the rear door from the vehicle opening.

A single door release handle is provided which is accessible from the interior of the vehicle or from the exterior (when the front door is open) to actuate the force transmission member. The location of the brain plate allows the placement of a window regulator within the spaced envelope of the rear door. The window regulator is laterally spaced with respect to the rear door first section. The window regulator transports a window pane into and out of the aligned window openings of the inner and outer panel.

It is an advantage of the present invention to provide a vehicle such as an extended cab pick up vehicle wherein the rear access door release handle locational placement allows for the installation of a relatively wide movable window with greater width in the access door.

It is optionally an additional advantage of the present invention to provide a vehicle such as afore described having an access door that has a single release handle which is accessible from the exterior when the front door is open and from the interior of the vehicle regardless of the front door position.

The above and other advantages of the present invention will be more apparent to those skilled in the art as the invention is further described in the accompanying drawings and detailed description.

BRIEF DESCRIPTION OF THE DRAWINGS

FIGS. 16, 18 and 19 illustrate portions of the lock out feature of the present invention which allows the door release mechanism to operate when the front door is open.

FIGS. 17 and 20 illustrate operation of the lock out mechanism when the front door is closed, effectively deactivating the release handle mechanism.

FIG. 21 illustrates a link of the release handle mechanism shown in FIGS. 22 and 23 with other links removed for clarity of illustration.

FIG. 24 is a partial sectional view showing the top portion of the rear access door in the door opening.

FIGS. 25 and 26 are views taken along lines 25—25 and 26—26 respectively of FIG. 6.

DETAILED DESCRIPTION OF THE INVENTION

Figure 1:
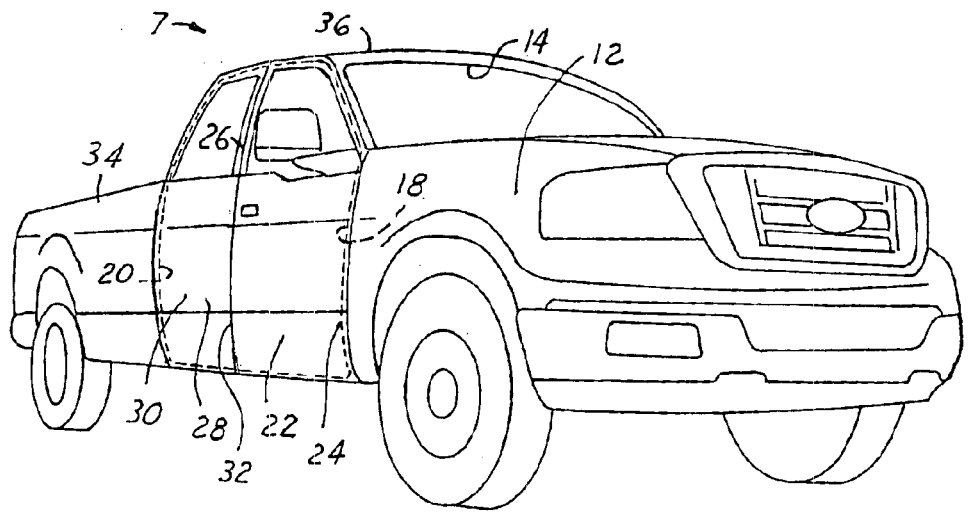
FIG. 1 is a perspective view of the vehicle according to the present invention.
Figure 2:
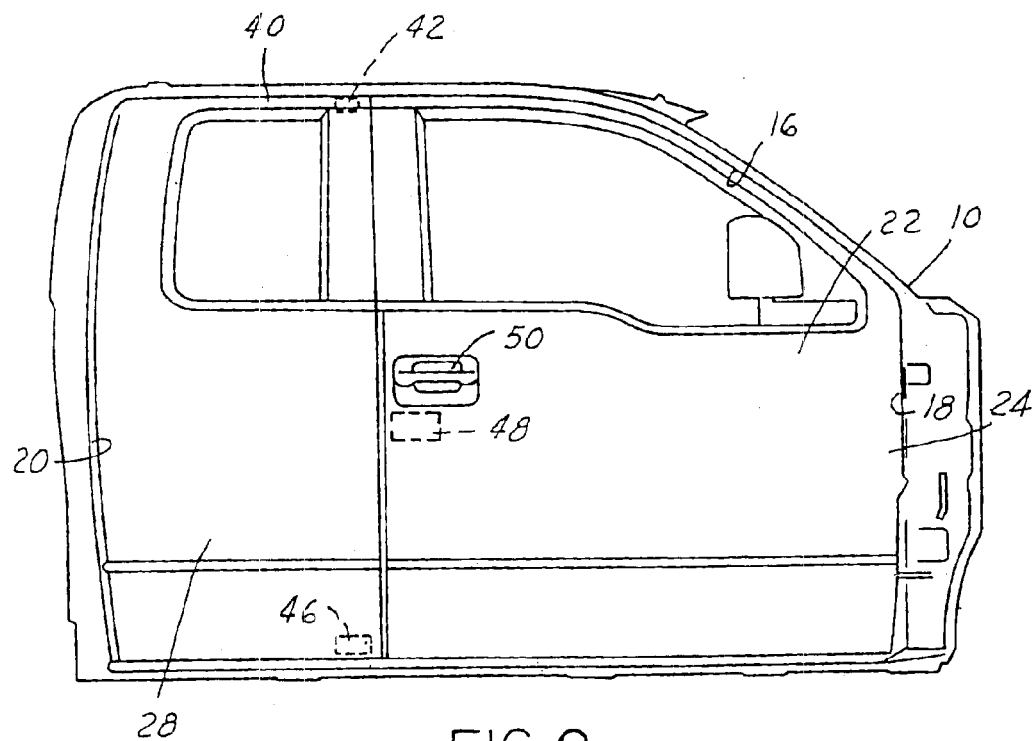
FIG. 2 is a side elevational view of the vehicle shown in FIG. 1.
Figure 3:
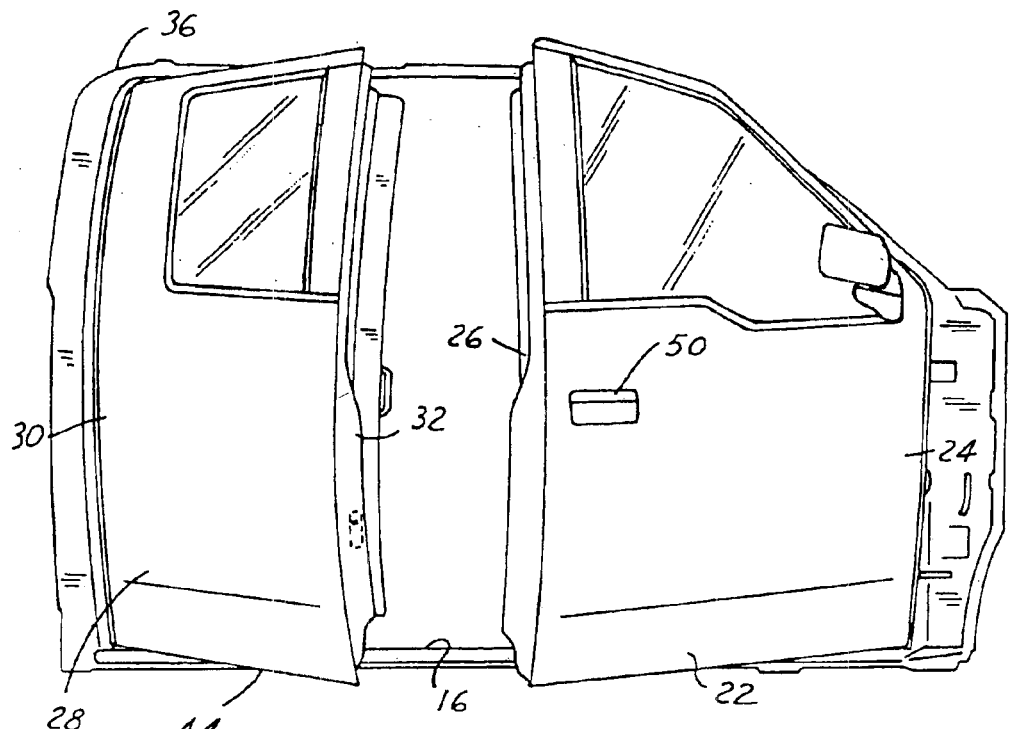
FIG. 3 is a side elevational view with doors of the vehicle shown in a partially open position.
Figure 11:
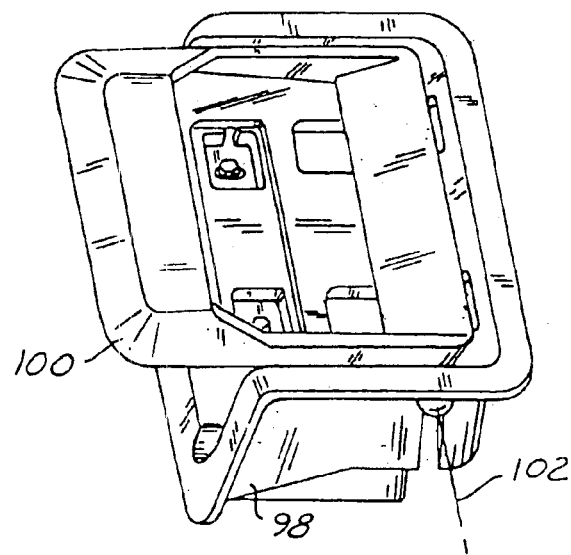
FIG. 11 is a perspective view of the release handle and bezel shown in FIG. 10.

Referring to FIGS. 1, 2 and 3, a vehicle 7 according to the present invention is provided. The vehicle 7 is a pickup truck having a body 10. The vehicle body 10 has an exterior 12 and an interior 14. Connecting the vehicle body exterior and interior is a pillarless side opening 16. The side opening 16 has a first or front extreme end 18 and a second or rear extreme end 20. Providing a movable barrier for a front portion of the opening 16 is a movable front or first door 22.

The front door 22 has a front end 24 which is pivotally connected with the vehicle body 10 adjacent the front end 18 of the side opening via hinges. The front door 22 generally opposite its pivotal connection with the body 10 has an extreme end 26.

Providing a barrier for a rear portion of the opening 16 is a movable rear access or second door 28. The second door 28 has a rear end 30 which is pivotally connected with the vehicle body 10 adjacent a rear end 20 of the side opening. The rear door has generally opposite its pivotal connection with the body 10 an extreme end 32. In their closed positions, the extreme end 32 of the second door 28 is overlapped by the extreme end 26 of the front door.

The vehicle 7 on its rearward end has a pickup bed 34 which is typically separated by a gap from a rearward end of the truck cap body 36. Referring additionally to FIGS. 4–14 and 21–23, the second door 28 along its upper end 40 has a latched connection 42 with the body 10 between the front and rear ends 18 and 20 of the body opening. The second door 28 also has along a bottom end 44 a latched connection 46 with the vehicle body 10 which is between the front and rear ends 18 and 20 of the side opening 16. When in the closed position (FIGS. 1 and 2), the first door 22 has a latched connection 48 with the second door 28. The latched connection 48 is moved from an open and closed position by a front door handle 50.

Figure 23:
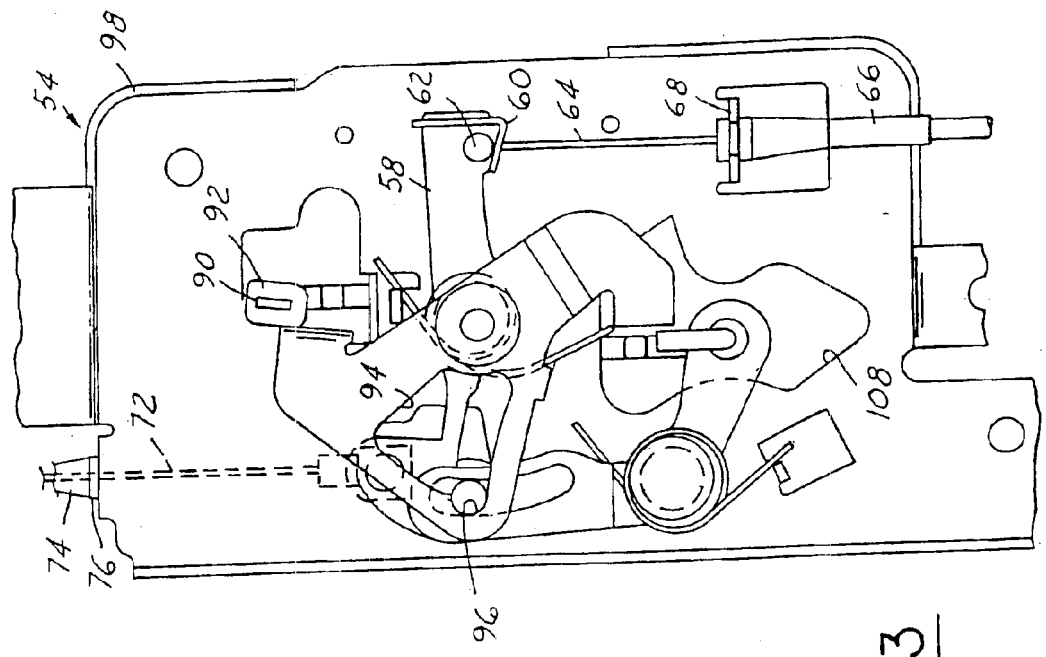
FIGS. 22 and 23 are views similar to FIGS. 12 and 13 illustrating the position of the release handle at rest.
Figure 22:
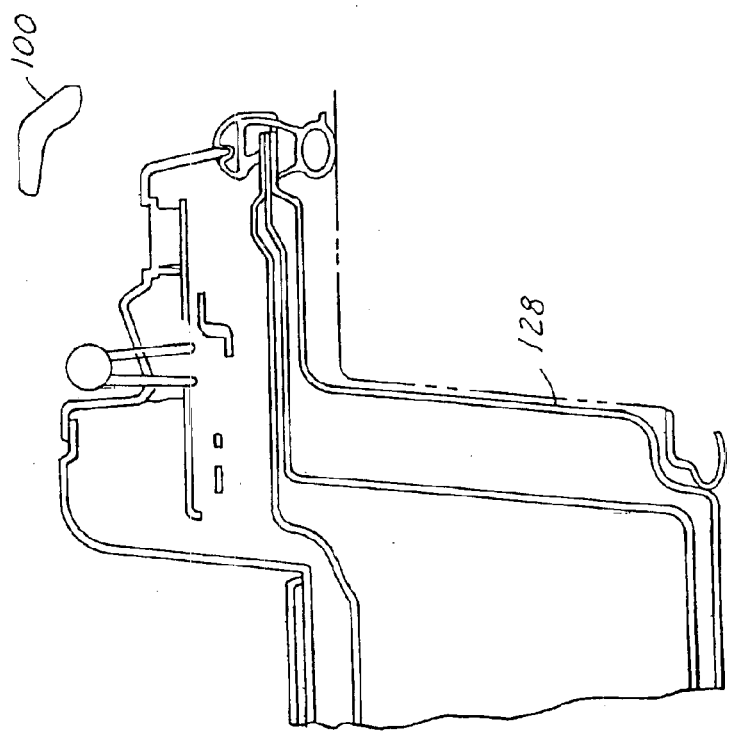
Figure 27:
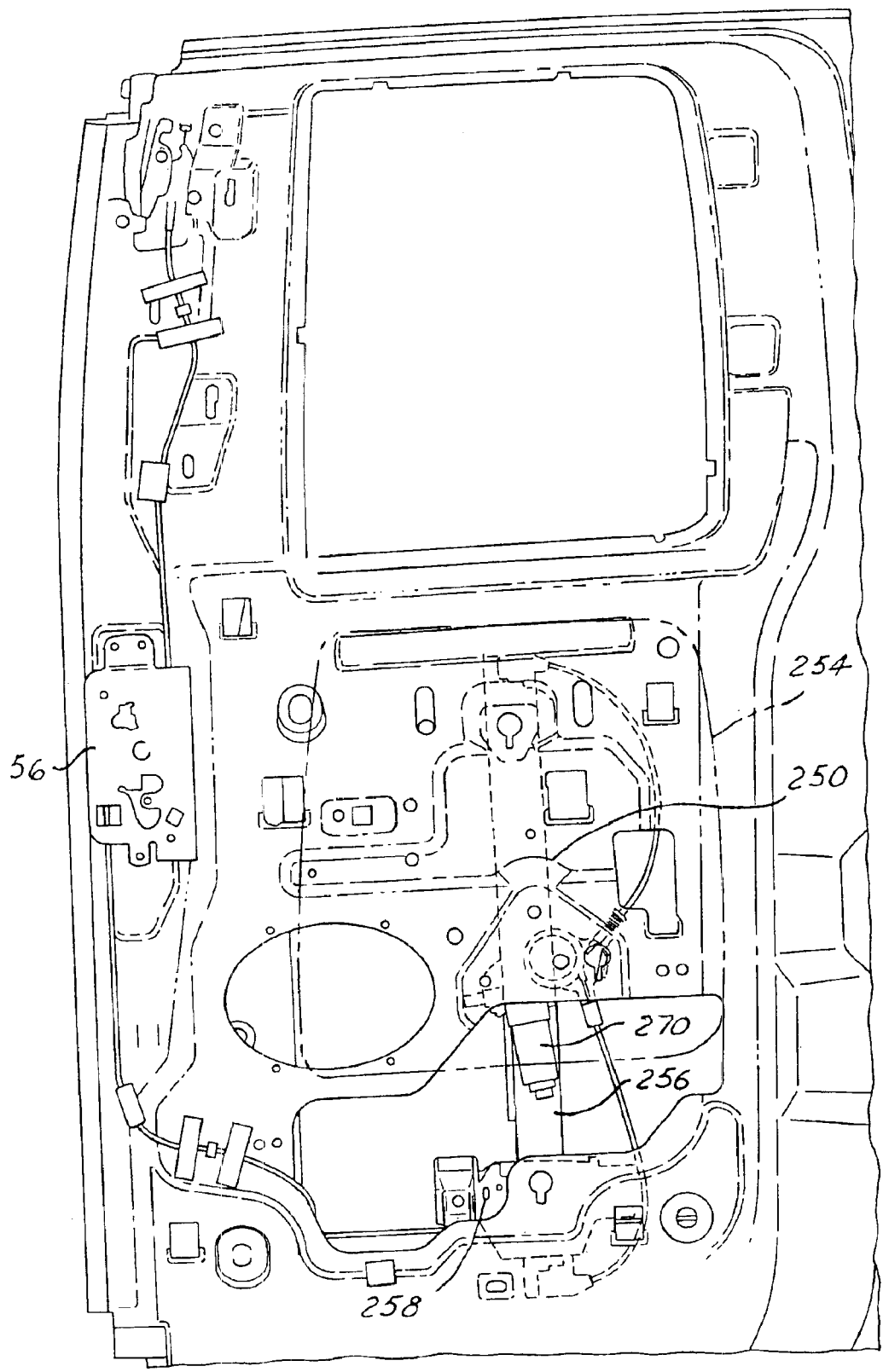
FIG. 27 is a front elevational view of the rear access door inner panel from an interior of the vehicle.
Figure 28:
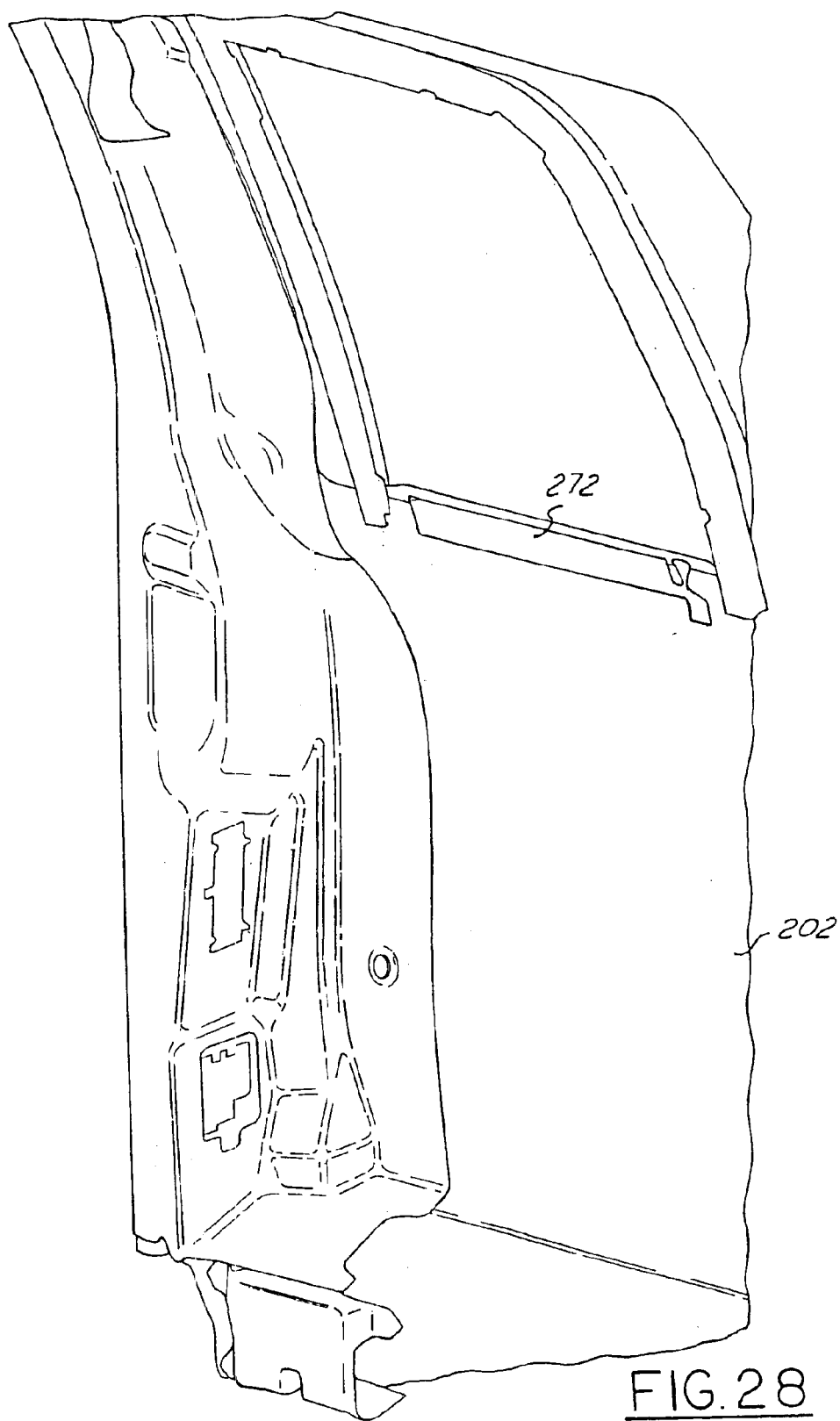
FIG. 28 is a front perspective view of the rear access door taken from the interior of the vehicle with the inner panel and window regulator hardware being removed to illustrate an intermediate reinforcement panel and an interior side of the rear access door outer panel.
Figure 29:
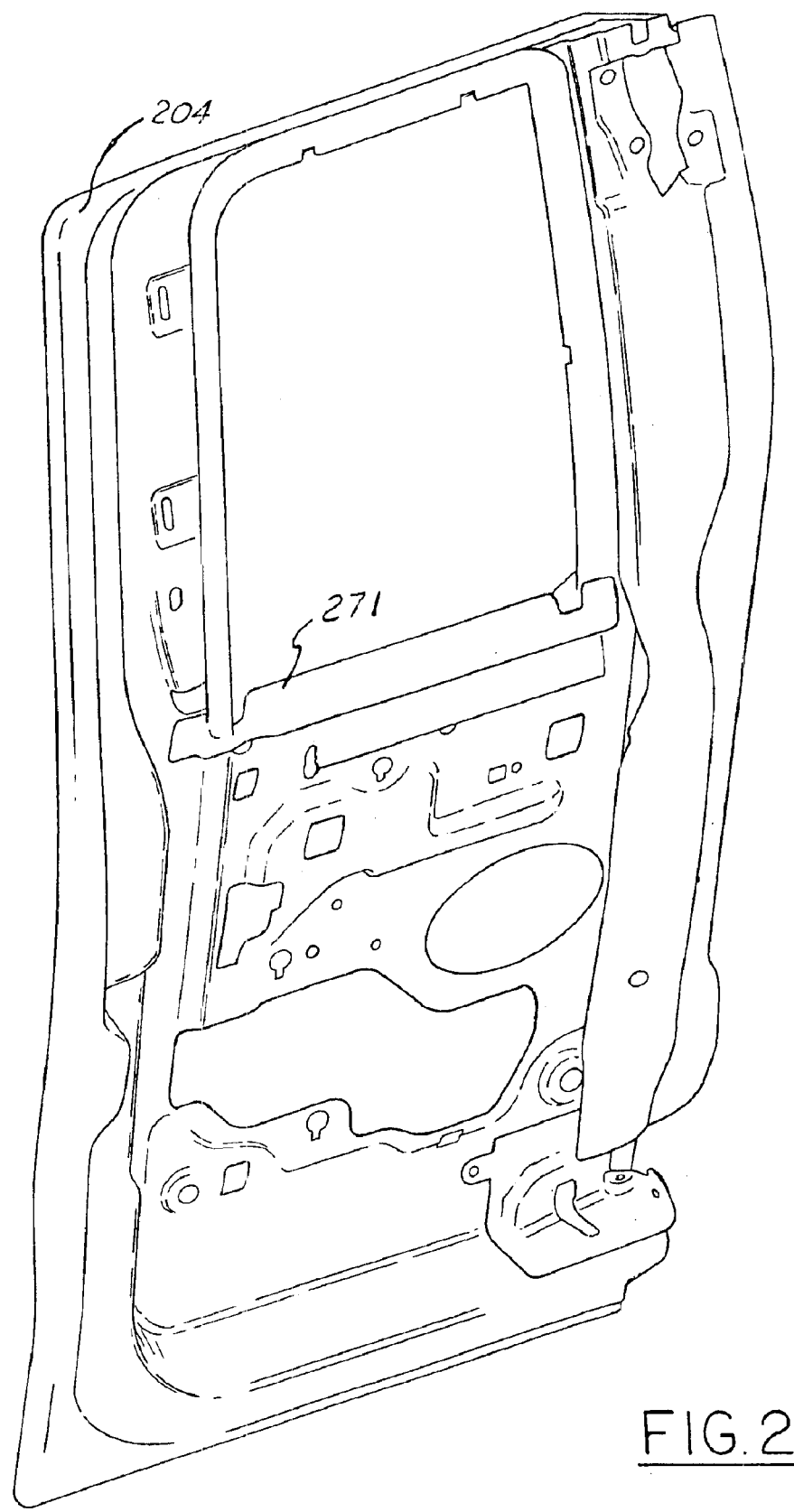
FIG. 29 is a front perspective view of the rear access door taken from the exterior of the vehicle with the door outer panel being removed to illustrate an exterior side of the rear access door inner panel.

On an interior wall 52 of the second door 28 there connected is a release handle mechanism 54. FIGS. 21–23 illustrate the release handle mechanism in a rest position. The release handle mechanism includes a brain plate 56 which is fixably connected to an interior wall 52 of the second door. In a manner well known in the art, the brain plate 56 will be concealed from view from an interior occupant of the vehicle 7 by appropriate interior door trim. Pivotally connected on the brain plate 56 is a first lever 58. The first lever 58 pivotal connection with the brain plate 56 is along a first axis 59. The first lever 58 has a tab 60. The tab 60 has a slot which entraps a crimp ball 62. The crimp ball 62 is connected with a force transmission member which is provided by a release cable 64. The release cable 64 has an outer sheath 66 which is crimped by a tab 68 of the plate 56. The release cable 64 upon an upward movement by the tab 60 of the first lever causes the latched connection 46 to release itself from a striker bar (not shown) adjacent the body opening 16.

The first lever 58 on one side has another tab 70. The tab 70 is on an end of the first lever 58 which is generally opposite from the first pivot access 59 from the tab 60. The tab 70 is connected with a force transmission member provided by a release cable 72. The release cable 72 has a sheath 74 which is affixed with a tab 76 of the plate 56. Movement of the tab 70 downward causes a pull on the release cable 72 to release latched connection 42 with a striker (not shown) which is positioned on the top portion of the vehicle body opening 16.

The first lever 58 also has a longitudinal generally arcuate pin slot 78. The pin slot 78 has captured therein a slot pin 80. The release handle mechanism additionally has pivotally connected along the first axis 59 a second pivot lever 82. The second pivot lever 82 has an inwardly bent tab 84 which forms a first contact surface and a lower tab 86 which forms a second contact surface. The second pivot lever 82 is torsionally biased by a spring 88 such that tab 84 rests upon a bumper 92 of a tab stop 90. The tab stop 90 is formed from the brain plate 56. The second lever 82 has an almost triangular pin slot 94. The pin slot 94 at its lower left hand corner has semi-circular detent portion 96 which encircles approximately 150 degrees of the diameter of the slot pin 80.

Fixably connected to the brain plate 56 is an escutcheon 98. The esthechon 98 has pivotally mounted thereto a grip lever 100 about pivot pins 101 aligned with generally horizontal second axis 102. The grip lever 100 extends forward of an extreme end 32 of the second door. Accordingly, the grip lever 100 is accessible from an exterior of the vehicle body 10 when the first door 22 is in the open position. The grip lever has a first finger 104 which extends in a generally horizontal direction generally perpendicular to the second axis 102. The first finger 104 extends through an upper opening 105 in the brain plate 56. (FIG. 13.)

Figure 13:
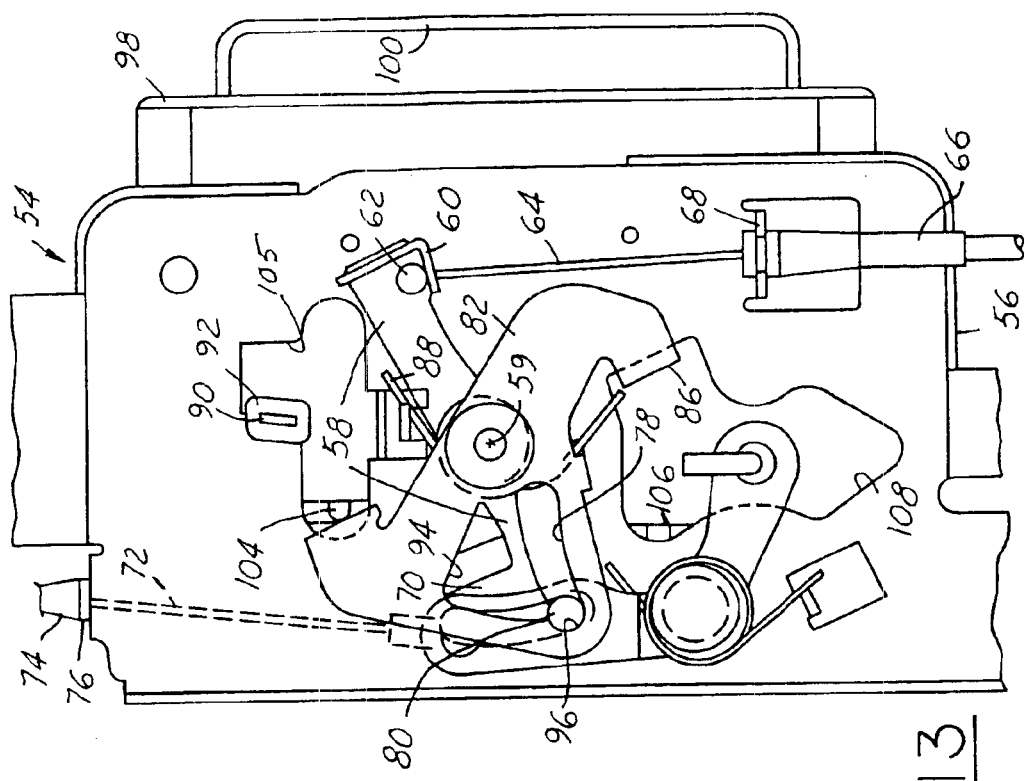
FIG. 13 is a side elevational view of the portion of the release handle mechanism corresponding to the action of the release handle shown in FIG. 12.
Figure 12:
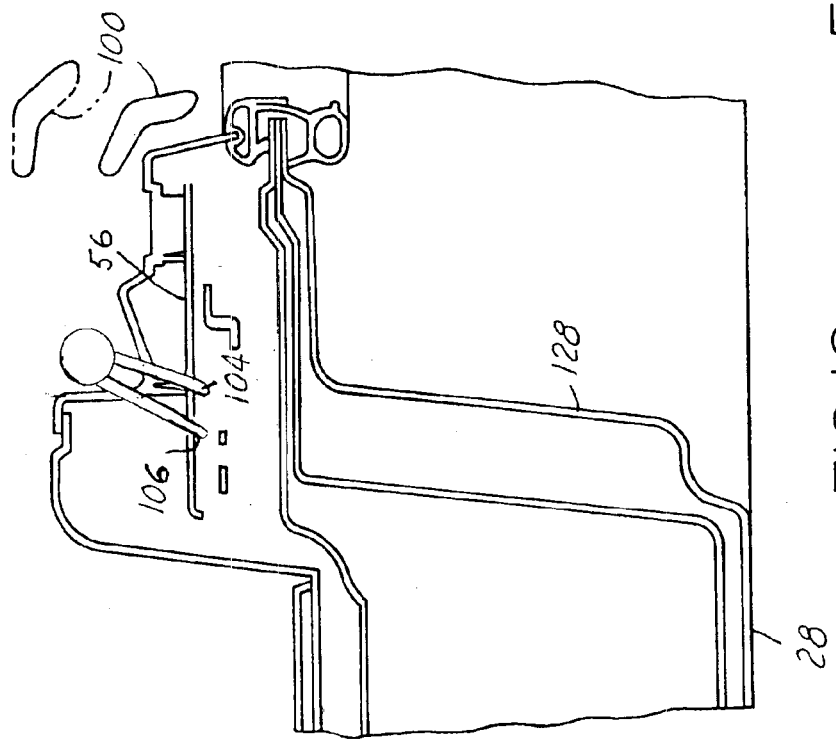
FIG. 12 is a sectional view illustrating movement of the release handle towards an exterior of the vehicle.

Pulling the grip lever 100 towards the exterior of the vehicle body 7 (FIGS. 12 and 13) causes the second first finger 104 to contact the tab 84 to cause the second pivot lever 82 to rotate in a first angular counterclockwise direction from a position shown in FIG. 13. The counterclockwise rotation of the second pivot lever 82 causes it to force the first pivot lever 58 to rotate counterclockwise by virtue of the entrapped slot pin 80 imparting the movement of the second pivot lever 82 to the first pivot lever 58. The counterclockwise rotation of the first pivot lever 58, as mentioned previously, causes a pull upon release cables 64 and 72 and therefore unlatches the second door 28 from its latched connections 42 and 46 with the vehicle body opening 16.

Figure 5:
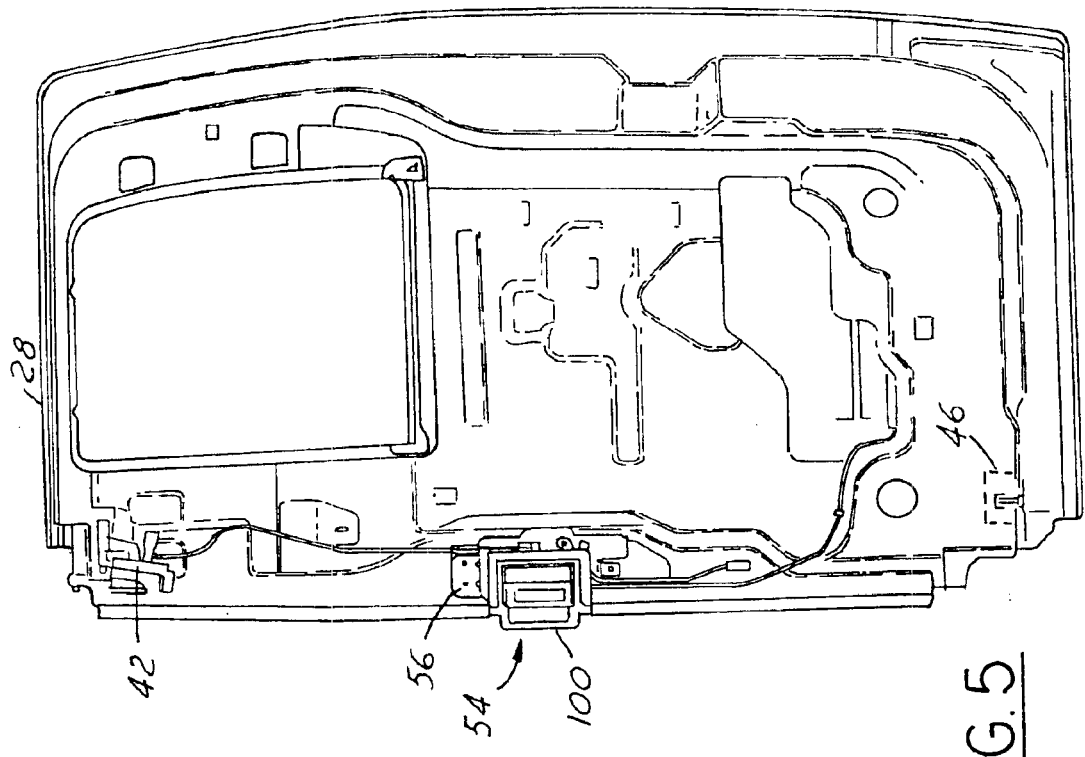
FIG. 5 is an interior view of the rear door shown in FIG. 4 with portions of the trim removed for clarity of illustration.
Figure 4:
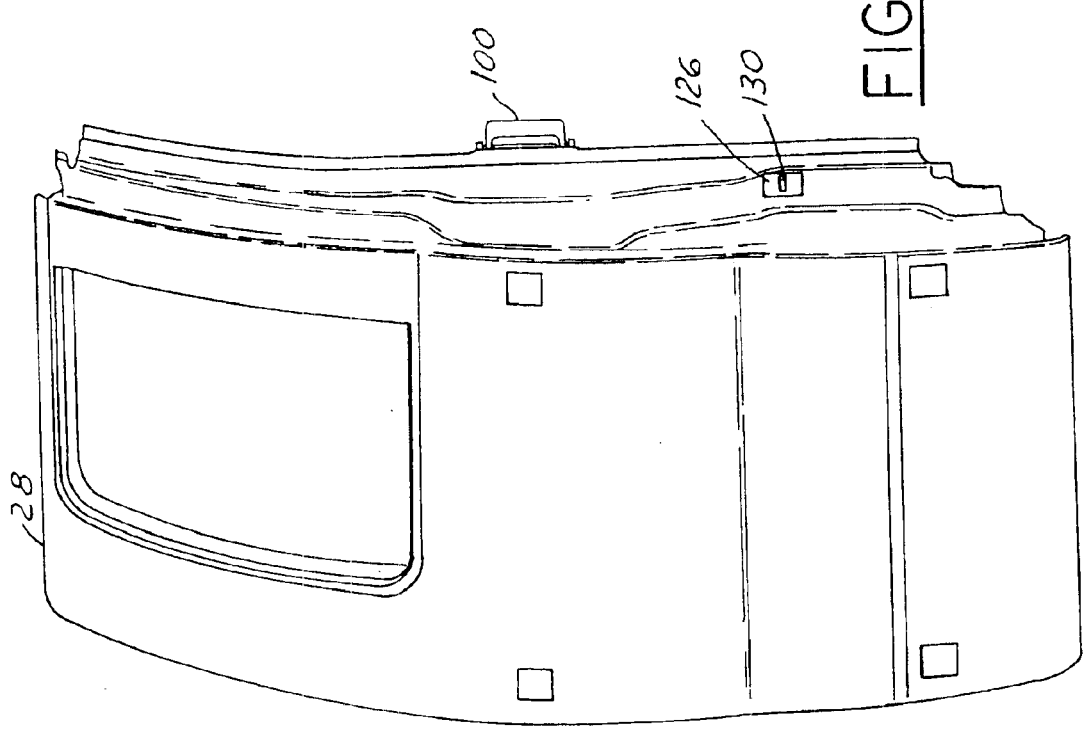
FIG. 4 is an enlarged exterior side elevational view of the rear door shown in FIGS. 1 through 3.
Figure 6:
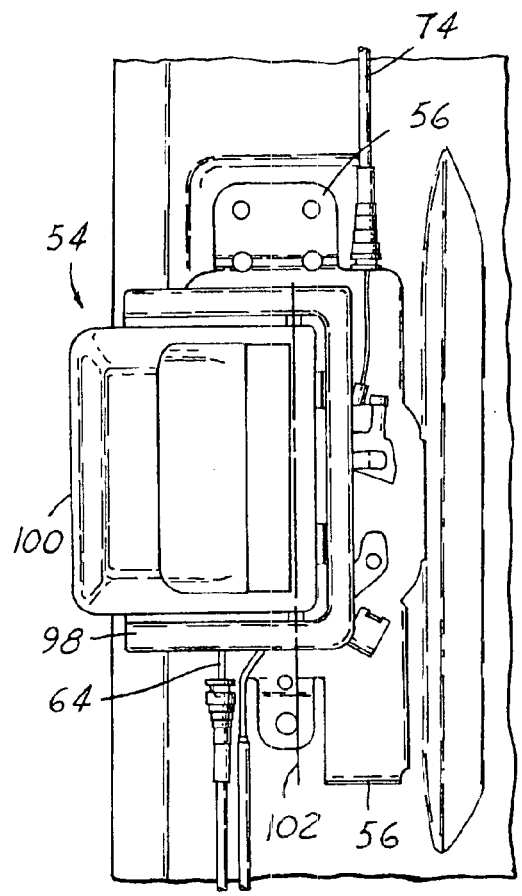
FIG. 6 is an enlarged partial side elevational view taken from the interior of the vehicle shown in FIG. 5 illustrating a release handle mechanism for the rear door.
Figure 7:
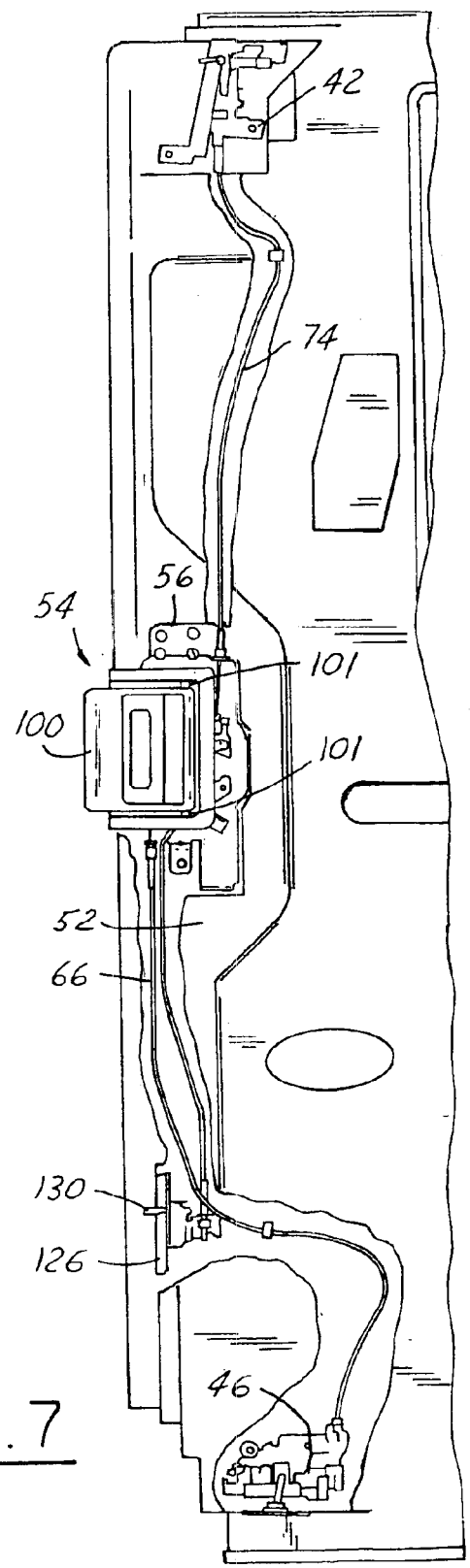
FIG. 7 is a diagrammatic view of the release handle shown in FIG. 6 along with the forced transmission members to the upper and lower latches and also to a key utilized in a lock out system.
Figure 8:
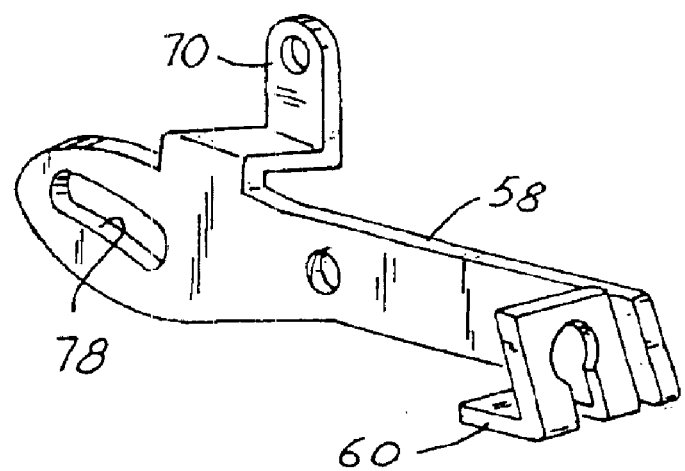
FIG. 8 is a perspective view of one of the levers in the release handle mechanism shown in FIG. 13.
Figure 15:
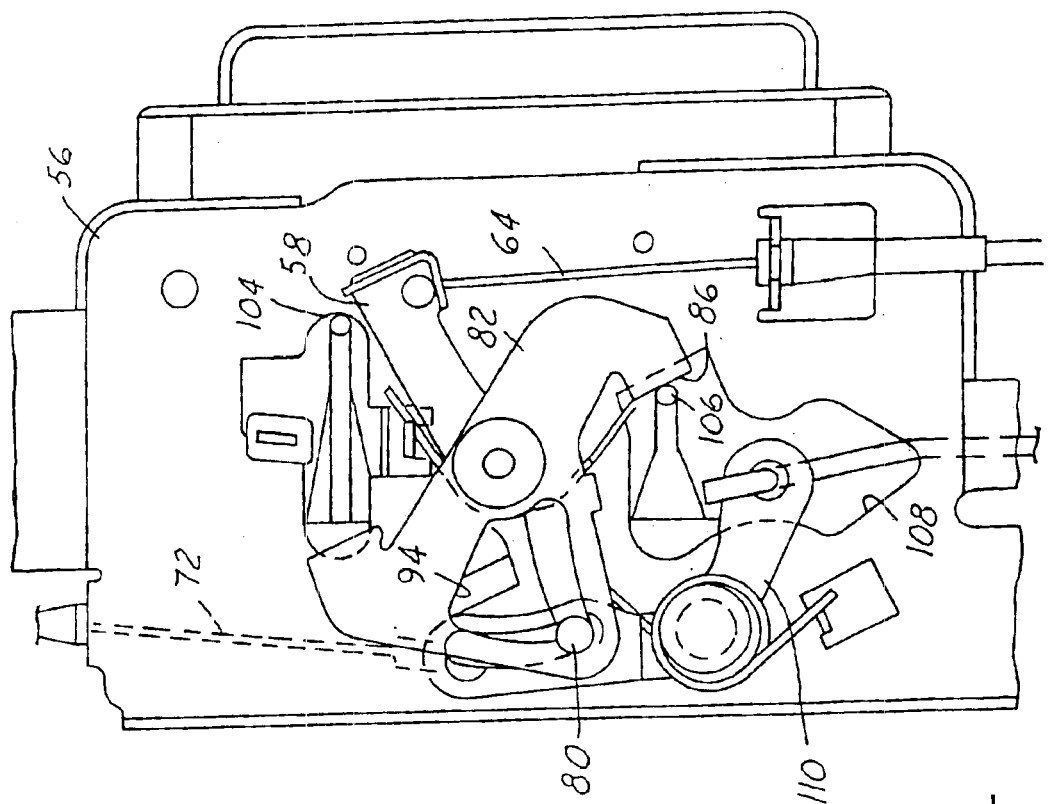
FIGS. 14 and 15 are views similar to FIGS. 12 and 13 illustrating movement of the release handle towards an interior of the vehicle.
Figure 14:
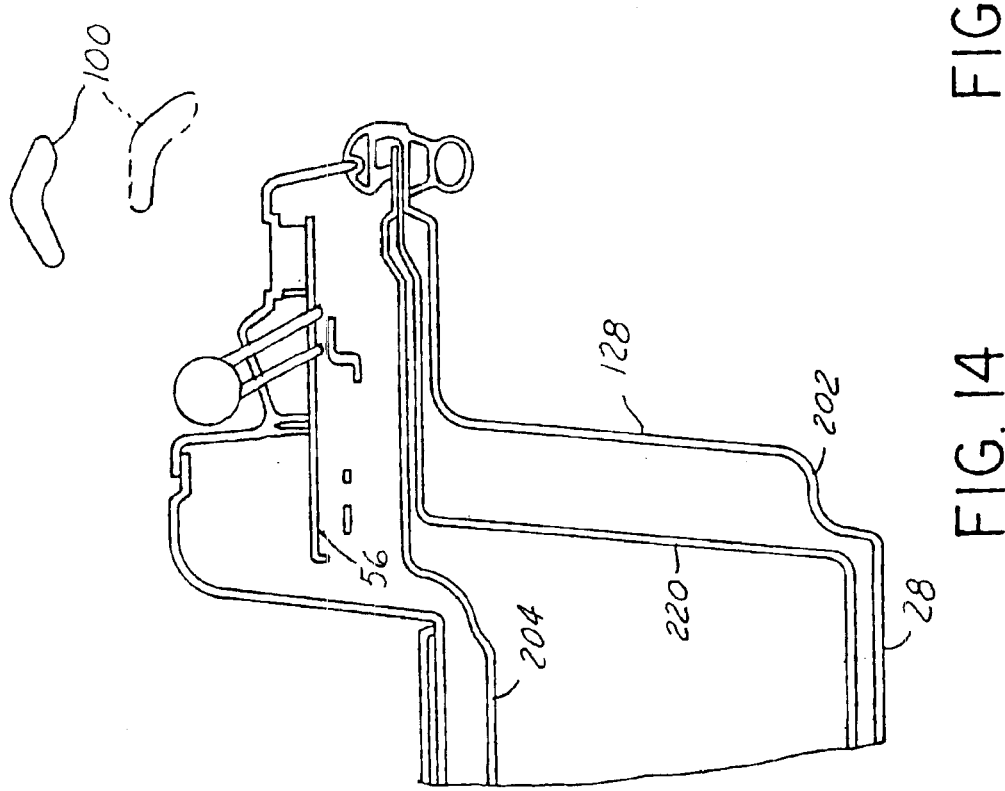

The grip lever 100 also has a second finger 106. The second finger 106 extends within a lower opening 108 provided in the plate 56. As can be seen in FIG. 5 the grip lever 100 is always accessible from the interior of the vehicle body 7 even when the first door 22 is in the closed position. Pulling the grip lever 100 towards the interior (FIGS. 14 and 15) of the vehicle causes the second finger 106 to contact the second contact surface 86 of the second pivot lever 82. Again, this motion causes the second pivot lever 82 to rotate in a counterclockwise direction as shown in FIG. 15 and accordingly, the latched connections 42 and 46 are released from their respective strikers.

Figure 9:
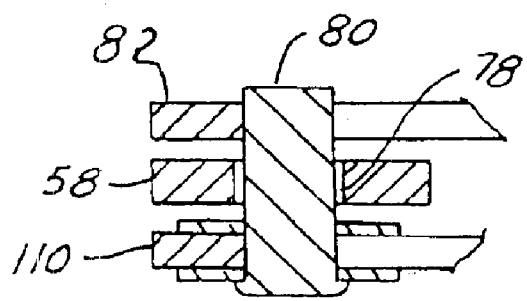
FIG. 9 is a sectional view taken along the slot pin shown in FIG. 13.
Figure 10:
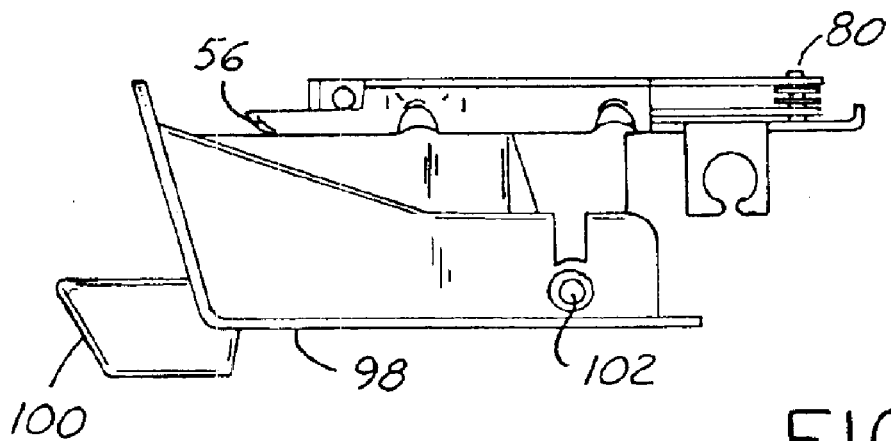
FIG. 10 is a top elevational view of a bezel of the present invention along with portions of the surrounding hardware.
Figure 16:
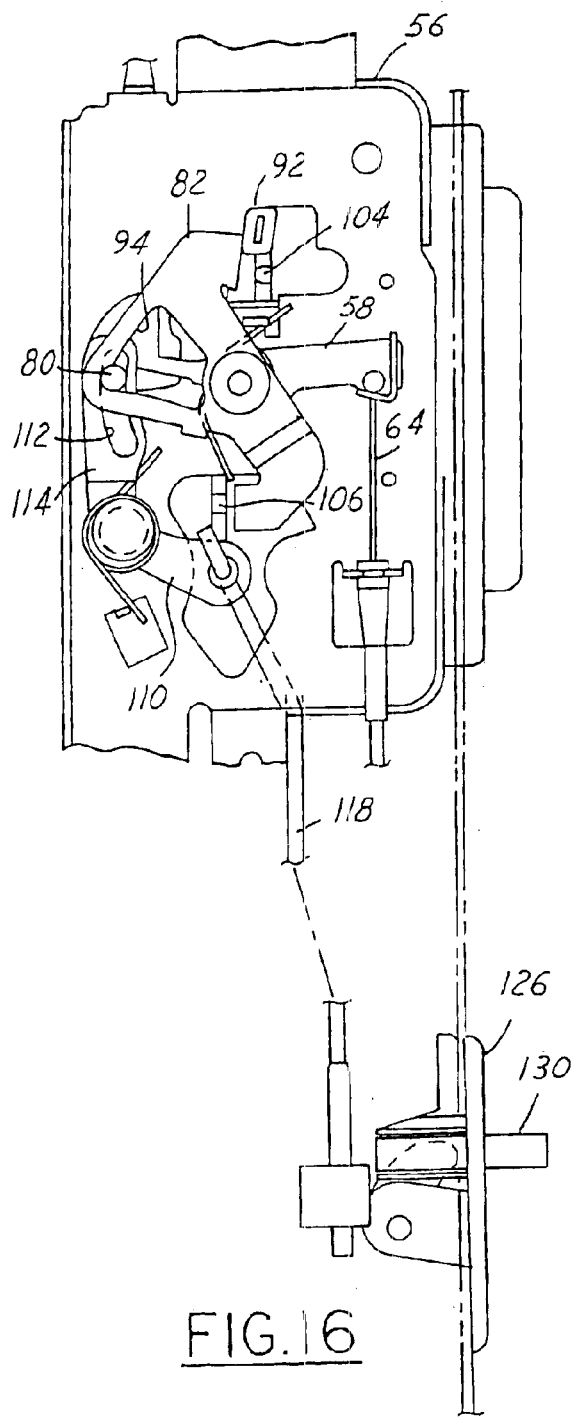
Figure 18:
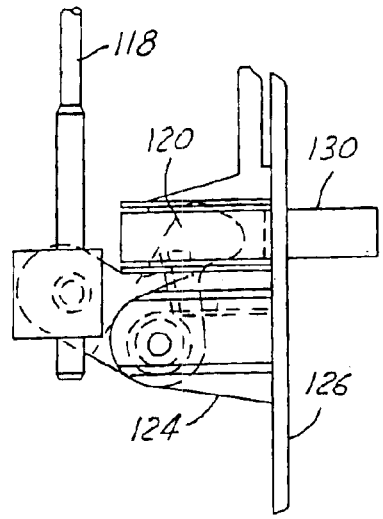

Referring to FIGS. 16–20, the release handle mechanism 54 also has a lock-out lever 110. The lock-out lever 110 has a longitudinal generally arcuate pin slot 112 on one of its arms 114. The lock-out lever 112 is pivotally biased by a spring 116 as shown in FIG. 16 in a counterclockwise direction. The pin slot 112 of the lock-out lever 110 also captures the slot pin 80. The slot pin 80 typically will have a double parallel spaced head which are juxtaposed by the lateral thickness of the first lock-out lever 110 (FIG. 9).

The lock-out lever 110 is pivotally connected with a rod 118. The rod 118 is pivotally connected with an L-shaped lever 120. The L-shaped lever 120 is pivotally biased by a spring 122. The L-shaped lever 120 is pivotally connected on a boss 124 which projects from a face plate 126. The face plate 126 is mounted to be generally flush with a strut wall 128 (FIG. 14) of the second door 28. The boss 124 also pivotally mounts a generally triangular key member 130. The spring biasing of the L-shaped lever 120 causes it to urge the pivotally mounted key away from the face plate 126. If the first door 22 is in an open position, the key 130 will be pivoted outward from the face plate 126 causing the L-shaped lever to pivot generally clockwise to the position shown in FIGS. 18 and 19 causing the rod 118 to be pushed upward by virtue of its pivotal connection with the L-shape lever 120.

Figure 17:
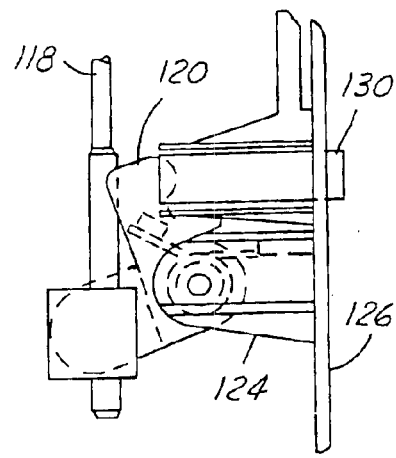

The upward movement of the rod 118 will cause the lock-out lever to be urged in a generally counterclockwise direction (FIG. 16) causing the slot pin 80 to be engaged or captured within the detent portion 96 of the second pivot lever. Accordingly, motion of the second pivot lever 82 imparted by either pulling or pushing on the grip lever 100 will cause a unlatching of the second door 28. If the first (front) door 22 is in its closed position, the key 30 will be pushed inwardly against the action of the spring 122 and the L-shaped lever will be pivoted in a generally counterclockwise direction as shown in FIGS. 17 and 20 causing the rod 118 to be pulled downward.

The above noted action will cause the lock-out lever 110 to be rotated in a clockwise direction (FIG. 20). The clockwise rotation of the lever 110 will cause the slot pin 80 to be taken out of the detent portion 96 of the second lever 82 and accordingly, the slot pin 80 will be in a portion of the pin slot 94 of the second pivot lever wherein movement of the second pivot lever 82 will not move the pin slot. When movement of the second pivot lever 82 does not impart movement to the slot pin 80, the release mechanism 54 is deactivated and the release lever 100 can be pushed or pulled without affecting release of the latch mechanisms 42 and 46. Accordingly, whenever the first door 22 is in the closed position, the release mechanism 54 is essentially deactivated.

The latched connections 42, 46 and 48 can be of several type which are conventional in the art and may be similar or identical to those shown and described in commonly assigned U.S. Pat. No. 6,059,352, the disclosure of which is incorporated by reference herein. In other embodiments not shown the upper and lower latch mechanisms 42, 46 can be activated by rods rather than cables.

The door 28 is primarily fabricated from an outer panel 202 and an inner panel 204. The outer panel 202 and inner panel 204 are weldably joined to one another along their perimeter and form a spaced envelope therebetween. The inner panel 202 and outer panel 204 have window opening 210 and 212, respectively, which are aligned with one another. On an end of the second door 28 most adjacent to the first door 22, is a reinforcement panel 220. The reinforcement panel 220 is juxtaposed between the inner and outer panels 220, 224.

Adjacent to the first doors the second door 28 has a first section 222 wherein the inner panel 204 and reinforcement panel 220 are closely laterally mated together. The brain plate 56 has an integral upper L-shaped connector tab 224 and a lower L-shaped connector tab 226. Connecting the upper connector tab 224 to the first section 222 of the second door are two screws 230 secured by nuts 232. Connecting the brain plate lower connector tab 226 to the first section 220 of the door is another connector screw 230 along with an associated nut 232.

Connected within the spaced envelope provided by the outer and inner panels 222 and 204 is a powered window regulator 250. The power window regulator is laterally spaced with respect to the first section 222 of the door and transports a window pane 254 into and out of the aligned window openings 210 and 212. The window regulator as a post 256 supports track for a slider assembly 258. The window regulator 250 is powered by a motor 270.

The interior panel 204 along its exterior side has an adhesively joined window opening reinforcement panel 271 to add strength to the door adjacent the window opening. In a similar fashion, the exterior door panel 202 has a window opening reinforcement panel 272 adhesively joined thereto on its interior side.

As best seen in FIG. 24, the door opening has an outward projection 300 which forms a gap in which the top of the door 24 fits therein. This configuration of door roof interface is typically referred to as an insert type door.

In another embodiment of the present invention (not shown) the vehicle first and second doors are rear Dutch doors of a van or sport utility type vehicle.

The present invention has been described in a preferred embodiments but it will be apparent to those skilled in the art of the various changes and modifications which can be made to the invention without departing from the spirit or scope of the invention as it is encompassed and defined by the following claims.

What is claimed is:

1. A vehicle comprising:
 a vehicle body with an interior and an exterior having an opening with first and second ends;
 a first movable door providing a barrier for a first portion of said opening;
 a second movable door providing a barrier for a second portion of said opening, said second door having a latch connection with said vehicle body between said opening first and second ends, said second door having an outer and inner panel forming a spaced envelope there between with said inner and outer panels having an aligned window opening, said second door having on a portion of said second door adjacent said first door a reinforcement panel juxtaposed between said inner and outer panels, and said second door having a first section wherein said inner and reinforcement panels are closely laterally mated;
 a brain plate connected to said inner panel on said first section;
 a first lever for actuating a force transmission member to release said latch connection, said first lever being pivotally connected to said brain plate; and
 a window regulator connected within said spaced envelope of said second door, said window regulator being laterally spaced with respect to said first section within said spaced envelope for transporting a window pane into and out of said aligned window opening.

2. A vehicle as described in claim 1, wherein said first door, when closed is latchably connected to said second door.

3. A vehicle as described in claim 1, wherein said first door is pivotally connected to said vehicle adjacent said opening first end and said second door is pivotally connected to said vehicle adjacent said opening second end.

4. A vehicle as described in claim 1, wherein said first and second doors are side doors of said vehicle and said vehicle has a pickup bed rearward of said second door.

5. A vehicle as described in claim 1, wherein said first door, when closed has a portion which overlaps said second door.

6. A vehicle as described in claim 1, wherein said second door has the latch connection with said vehicle body adjacent a top end of said second door and adjacent a bottom end of said second door.

7. A vehicle as described in claim 1, wherein said window regulator is powered.

8. A vehicle as described in claim 1, wherein said window regulator is connected with said inner panel.

9. A vehicle as described in claim 1, wherein said window regulator can totally remove said window pane out of said window opening.

10. A vehicle as described in claim 1, further including a release handle operatively associated with said lever, said release handle being accessible from the interior of said vehicle body when said first door is closed or opened, and said release handle being accessible from the exterior of said vehicle body when said first door is opened.

11. A vehicle as described in claim 10, wherein said handle extends past an extreme end of said second door.

12. A vehicle as described in claim 10, wherein said release handle can be pulled inward to release said second door.

13. A vehicle as described in claim 12, wherein said release handle can be pulled outward to release said second door.

14. A vehicle as described in claim 10, wherein said release handle can be pulled outward to release said second door.

15. A vehicle as described in claim 10, wherein said release handle is disabled when said first door is closed.

16. A vehicle as described in claim 1, having a window opening reinforcement panel joined to an exterior side of said inner panel.

17. A vehicle as described in claim 1, having a window opening reinforcement panel joined to an interior side of said outer panel.

18. A vehicle as described in claim 1, wherein said second door is an insert type of door.

19. A vehicle comprising:
 a vehicle body with an interior and an exterior having a side opening with first and second ends;
 a first door providing a barrier for a first portion of the opening pivotally attached to said first end of said opening;
 a second door providing a barrier for a second portion of said opening, said second door having a latch connection with said vehicle body between said opening first and second ends, and said second door being pivotally connected to said vehicle body adjacent said opening second end, an extreme end of said second door opposite said pivotal connection of said second door with said body being overlapped by said first door when said first door is closed, and said second door having an outer and inner panel forming a spaced envelope there between with aligned window openings, said second door having a reinforcement panel juxtaposed between said inner and outer panels and said second door having adjacent said first door a first section wherein said inner and reinforcing panels are closely laterally mated;

a brain plate connected to said inner panel on said first section;

a first lever for activating a forced transmission member to release said latch connection, said first lever being pivotally connected to said brain plate;

a release handle operatively associated with said first lever and being pivotally connected to said door; and a powered window regulator connected within said spaced envelope of said second door for transporting a window pane into and out of said aligned window openings of said second door.

20. A vehicle as described in claim 19 wherein said release handle is accessible from an interior of the body, said release handle extending from the extreme end of said second door opposite said second door pivotal connection with said vehicle body, said release handle being accessible from the exterior of said vehicle body when said first door is open and said release handle unlatches said second door latch connection when pulled outward or inward; and wherein said release handle is deactivated when said first door is closed.

21. A vehicle as described in claim 20, wherein said first lever is pivotally connected to said brain plate along a first axis, said first lever having a pin slot and wherein a pin is captured within said pin slot, and wherein there is a second lever pivotally connected to said brain plate along said first axis and spring biased against a stop, said second lever having first and second contact surfaces and said second lever having a pin slot capturing said pin, and wherein said release handle is pivotally connected with said second door along a second axis having first and second fingers to contact with said first and second contact surfaces wherein pivotal movement of said release handle in a first pivotal direction causes said first finger to contact said second lever first contact surface to pivot said second lever in a first pivotal direction and, wherein pivotal movement of said release handle in a second pivotal direction causes said release handle second finger to contact said second lever second contact surface to pivot said second lever in said first pivotal direction; and wherein there is a lock out lever pivotally connected to said brain plate along a third pivotal axis having a pin slot capturing said pin wherein in a first position said lock out lever positions said pin so that pivotal movement of said second lever is transferred to said first lever and wherein said lock out lever in a second position positions said pin wherein pivotal movement of said second lever is not transferred to said first lever.

\* \* \* \* \*